United States Patent
Termath et al.

(10) Patent No.: US 12,163,056 B2
(45) Date of Patent: Dec. 10, 2024

(54) COMPOSITIONS COMPRISING AMMONIUM POLYPHOSPHATES

(71) Applicant: CLARIANT INTERNATIONAL LTD, Muttenz (CH)

(72) Inventors: Andreas Termath, Cologne (DE); Andrea Zurstrassen-Gassen, Erftstadt (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 18/038,575

(22) PCT Filed: Feb. 1, 2022

(86) PCT No.: PCT/EP2022/052317
§ 371 (c)(1),
(2) Date: May 24, 2023

(87) PCT Pub. No.: WO2022/171489
PCT Pub. Date: Aug. 18, 2022

(65) Prior Publication Data
US 2024/0002680 A1    Jan. 4, 2024

(30) Foreign Application Priority Data

Feb. 15, 2021    (EP) .................................... 21157118

(51) Int. Cl.
*C09D 5/18*  (2006.01)
*C09D 7/20*  (2018.01)
*C09D 7/40*  (2018.01)
*C09D 7/43*  (2018.01)
*C09D 7/61*  (2018.01)

(52) U.S. Cl.
CPC ............... *C09D 5/185* (2013.01); *C09D 7/20* (2018.01); *C09D 7/43* (2018.01); *C09D 7/61* (2018.01); *C09D 7/69* (2018.01)

(58) Field of Classification Search
None
See application file for complete search history.

(56) References Cited

U.S. PATENT DOCUMENTS

| 3,978,195 A | 8/1976 | Schrodter et al. |
| 5,277,887 A | 1/1994 | Staffel et al. |

(Continued)

FOREIGN PATENT DOCUMENTS

| CN | 101348721 | 1/2009 |
| CN | 101439851 A | 5/2009 |

(Continued)

OTHER PUBLICATIONS

CN-109929374-A, English translation (Year: 2019).*

(Continued)

*Primary Examiner* — Stefanie J Cohen

(57) ABSTRACT

The invention relates to compositions comprising as component (A) 0.1% to 99.9% by weight of phase II ammonium polyphosphate and as component (B) 0.1% to 99.9% by weight of phase I and/or phase III, IV, V and/or VI ammonium polyphosphate, where the sum total of the components is 100% by weight, and to the use thereof in intumescent coatings.

14 Claims, 2 Drawing Sheets

Figure 1:
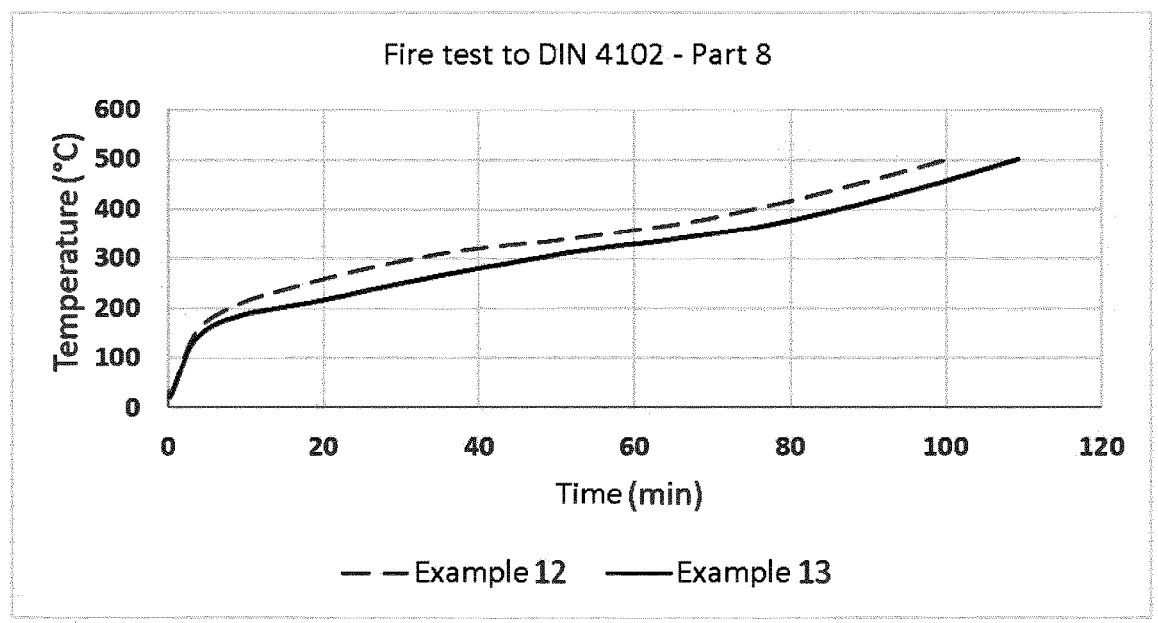

Fire test to DIN 4102 - Part 8

— Temperature differential of Examples 12 and 13 over time

(56) References Cited

U.S. PATENT DOCUMENTS

| | | | |
|---|---|---|---|
| 6,258,298 B1 * | 7/2001 | Blount | C08G 18/3831 |
| | | | 252/607 |
| 6,444,315 B1 * | 9/2002 | Barfurth | C09K 21/00 |
| | | | 428/407 |
| 7,420,007 B2 | 9/2008 | Bauer et al. | |
| 11,628,589 B2 | 4/2023 | Termath | |
| 2004/0036061 A1 | 2/2004 | Rhodes | |
| 2019/0031892 A1 * | 1/2019 | Bender | C09D 5/00 |

FOREIGN PATENT DOCUMENTS

| | | |
|---|---|---|
| CN | 103554999 | 2/2014 |
| CN | 103588992 | 2/2014 |
| CN | 108219233 | 6/2018 |
| CN | 109929374 A * | 6/2019 |
| EP | 0004560 A1 | 10/1979 |
| EP | 0537475 A1 | 4/1993 |
| EP | 1544206 A1 | 6/2005 |
| JP | H04300204 | 10/1992 |
| JP | H07187626 | 7/1995 |
| JP | H08133711 A | 5/1996 |
| JP | H09286985 | 11/1997 |
| JP | 2018537549 A | 12/2018 |
| JP | 2019511597 A | 4/2019 |
| KR | 20180072762 A | 6/2018 |
| WO | 2017067906 A1 | 4/2017 |
| WO | 2017/153227 A1 | 9/2017 |
| WO | 2020137573 | 7/2020 |
| WO | 2020137575 | 7/2020 |

OTHER PUBLICATIONS

Shen et al., "Preparation and Characterization of Crystalline Long-Chain Ammonium Polyphosphates", Journal of the American Chemical Society, 91:1, pp. 62-67 (1969).

Waerstad et al., "Preparation and Characterization of Some Long-Chain Ammonium Polyphosphates", J. Agric. Food Chem., vol. 24, No. 2, pp. 412-415 (1976).

Watanabe et al., "Preparation of Ammonium Polyphosphate Form II from the System of Ammonium Orthophosphate-Urea", Bull. Chem. Soc. Jpn, 73, pp. 115-119 (2000).

Watanabe et al., "New Preparation Processes of Phases II and V Ammonium Polyphosphate And Their Use As Flame Retardants", Phosphorus Research Bulletin, vol. 16, pp. 39-46 (2003).

Sheridan et al., "Crystalline Polyammonium Catena-Polyphosphate", Inorganic Syntheses, vol. XIX, pp. 278-280 (1979).

Watanabe et al., "Preparation of Ammonium Polyphosphate And Its Application to Flame Retardant", Phosphorus Research Bulletin, vol. 23, pp. 35-44 (2009) XP55827529A.

International Search Report and Written Opinion dated Apr. 19, 2022, issued in corresponding International Patent Application No. PCT/EP2022/052317.

International Preliminary Report on Patentability dated Jan. 9, 2023, issued in corresponding International Patent Application No. PCT/EP2022/052317.

"Flammschutzmittel" in Römpps Chemie-Lexikon 9th Ed, (1996) pp. 1369-1371.

Extended European Search Report issued in App. No. EP21157118, dated Aug. 6, 2021, 8 pages.

* cited by examiner

Progression of temperature of the reverse side of the plate as a function of time

COMPOSITIONS COMPRISING AMMONIUM POLYPHOSPHATES

The invention relates to compositions comprising ammonium polyphosphates.

Ammonium polyphosphates are widely used as flame retardants. In addition, it is possible to use ammonium polyphosphate for prevention of the evolution of nitrous gases in (acid) baths that contain free nitric acid and serve for surface treatment of metals (EP-A-0004560).

Ammonium polyphosphates may occur in several crystalline forms (I to VI), of which ammonium polyphosphate of form I can be synthesized from a condensing agent and phosphoric acid or a phosphate.

Ammonium polyphosphate of form II is a sparingly water-soluble product and is known as a flame-retardant constituent for use in synthetic resins. It is typically prepared from phosphorus pentoxide.

Known processes for preparing ammonium polyphosphate of form II are characterized in that ammonium polyphosphate of form I is subjected to a thermal treatment for a certain period of time (C. Y. Shen et al., Journal of American Chemical Society, vol. 91, p. 62 (1969). Likewise presented here are processes for preparing crystal forms II and IV.

M. Watanabe, M. Sakurai and M. Takahashi, Phosphorus Research Bulletin 2003, 16, p. 39-46 describe ammonium polyphosphates of form I and of form V.

Different processes for preparing ammonium polyphosphates of form II are described by M. Watanabe, N. Narita, M. Sakurai, H. Suzuki, Bulletin of the Chemical Society of Japan 2000, 73, 115-119 and R. C. Sheridan, J. F. McCullough, N. E. Stahlheber, C. Y. Shen in Inorganic Syntheses, John Wiley & ons, Inc, 1979, 278-280 and K. R. Waerstad, G. H. McClellan, J. Agric. Food Chem. 1976, 24, 412-415.

U.S. Pat. No. 3,978,195 claims a process for preparing essentially water-insoluble catenated ammonium polyphosphates, wherein equimolar amounts of ammonium orthophosphate and phosphorus pentoxide are reacted under constant mixing, kneading and comminution in a reactor provided with mixing tools at temperatures between 170 and 350° C. in the presence of ammonia gas.

In another process described in EP-A-0537475, ammonium orthophosphate, phosphorus pentoxide and gaseous ammonia are reacted with one another in a first phase in order to further condense and to dry the intermediate in a second stage on a pan dryer under ammonia atmosphere.

Ammonium polyphosphates are generally difficult to prepare in high purity and homogeneous form; in particular, the residual moisture content and hygroscopic properties thereof present considerable problems in storage and transport.

The ammonium polyphosphates known today are very often used in intumescent formulations that are then used in turn as fire-resistant coatings.

Whereas conventional fire-resistant formulations are used primarily for protection of less thermally sensitive substrates, such as steel, aluminium and/or concrete, there is an increasingly developing need for insulation (protection) of less thermally stable substrates. These may be organic and inorganic materials. These may have polymeric and non-polymeric character.

For all substrates, thermal insulation at low temperatures is indispensable, since not only are pyrolysis reactions that occur suppressed; in the case of inert substrates, for example steel, there is also an increase in the insulating effect over the complete course of the fire as a result of intumescence that occurs at low temperatures. It is possible to achieve much longer fire resistance times, or to distinctly reduce the amount applied.

It was therefore an object of the present invention to provide ammonium polyphosphates that are stable and easy to handle, and lead to increased substrate protection especially in the case of use in intumescent coatings.

This object is achieved by compositions comprising
as component (A) 0.1% to 99.9% by weight of phase II ammonium polyphosphate and
as component (B) 0.1% to 99.9% by weight of phase I and/or phase III, IV, V and/or VI ammonium polyphosphate, where the sum total of the components is 100% by weight.

The compositions preferably contain 60% to 99.9% by weight of component A and to 40% by weight of component B.

The compositions more preferably contain 65% to 92% by weight of component A and 8% to 35% by weight of component B.

Preference is given to compositions in which component A is phase II ammonium polyphosphate and component B is phase I ammonium polyphosphate.

Component A is preferably a phase II ammonium polyphosphate having the formula $(NH_4)_{n+2}P_nO_{3n+1}$ with n=300 to 100 000.

Component A is more preferably a phase II ammonium polyphosphate having the formula $(NH_4)_{n+2}P_nO_{3n+1}$ with n=1000 to 25 000.

Component B is preferably a phase I ammonium polyphosphate having the formula $(NH_4)_{n+2}P_nO_{3n+1}$ with n=5 to 100.

The compositions according to the invention preferably have a
residual moisture content (water content) to ISO 760 of less than 0.5%,
bulk density of 0.3 to 0.9 g/cm$^3$,
water solubility of less than 1.5% (10% suspension in water at 25° C.),
viscosity of less than 40 m Pas (Brookfield DV3T, speed 50 rpm, spindle 1),
particle size $d_{50}$ of 1 to 50 µm, measured by laser diffraction,
particle size $d_{90}$ of 10 to 60 µm, measured by laser diffraction, and
pH (10% suspension in water at 25° C.) of 4 to 8.

In the compositions according to the invention, it is preferable that the ammonia polyphosphates have been microencapsulated with organofunctional (poly)silanes, (poly)siloxanes, (poly)silazanes, modified waxes, polyurethane, polyepoxides, urea-formaldehyde resins, melamine-formaldehyde resins, emulsions based on (meth)acrylate resins, on styrene/acrylate copolymers, urethanes, on ethylene/nonyl acetate copolymers, on rubber and/or mixtures thereof.

Preference is given to compositions also containing up to 10% by weight, based on the amount of components (A) and (B), of the following components: ammonium sulfate, triethylammonium sulfate, tetramethylammonium sulfate, trimethylammonium sulfate, dimethyl sulfate, diethyl sulfate, dipropyl sulfate, sodium octylsulfate, sodium decylsulfate, sodium octadecylsulfate, lauryl sulfate, urea sulfate, melamine sulfate, hydroxylamine sulfate, hydrazine sulfate, potassium sulfate, potassium hydrogensulfate, sodium sulfate, sodium hydrogensulfate, magnesium sulfate, magnesium hydrogensulfate, calcium sulfate, calcium hydrogensulfate, barium sulfate, potassium aluminium sulfate, aluminium sulfate, iron(III) sulfate, iron(II) sulfate, cobalt sulfate, titanium sulfate, zinc sulfate, tin sulfate, cerium sulfate, lithium sulfate, trimethylsulfonium methylsulfate or mixtures thereof.

The invention also relates to the use of the compositions according to at least one of claims 1 to 10 for lowering the starting reaction temperature for intumescent coatings, for increasing the fire resistance capacity of intumescent coatings, as flame retardants for clearcoats and intumescent coatings, in or as flame retardants for wood and other cellulose products, in or as reactive and/or non-reactive flame retardants for polymers, gelcoats and/or unsaturated polyester resins, for production of flame-retardant polymer molding compounds, for production of flame-retardant polymer mouldings, for rendering polyester and pure and blended cellulose fabrics flame-retardant, in polyurethane foams, in polyolefins, in unsaturated polyesters and phenolic resins and for rendering textiles flame-retardant.

The invention likewise relates to the use of the compositions according to at least one of claims 1 to 10 in or for plug connectors, current-bearing components in power distributors (residual current protection), circuit boards, potting compounds, power connectors, circuit breakers, lamp housings, LED lamp housings, capacitor housings, coil elements, ventilators, grounding contacts, plugs, in/on printed circuit boards, housings for plugs, battery housings, cables, flexible circuit boards, charging cables, motor covers, textile coatings and other products.

In particular, the invention relates to the use of the compositions according to at least one of claims 1 to 10 for fire-resistant coatings on steel, wood, wood-based materials, paper, mineral wool, plasterboard, plastics, metals, alloys, fabrics made of synthetic or natural fibres and other materials and/or as solder mask and for electrical switches and circuits.

Particular preference is given to using the compositions according to at least one of claims 1 to 10 for coating steel constructions such as steel beams and steel supports, ceilings, walls, cables, pipes, conduits, cable and combination bulkheads, doors, curtains, smoke barriers, blinds, safety cabinets, installation cabinets and other articles.

The invention also relates to fire-resistant coatings comprising film-forming binders, blowing agents, compositions according to one or more of claims 1 to 10 as foam-forming substance, carbon-forming substance, auxiliaries and additives and optionally thickeners, dispersing additives and solvents and/or solvent mixtures.

Such fire-resistant coatings preferably comprise film-forming binders, blowing agents, compositions according to one or more of claims 1 to 10 as foam-forming substance, at least one polyhydric alcohol as carbon-forming substance, auxiliaries and/or additives, thickeners, dispersing additives and solvents and/or solvent mixtures.

Particular preference is given here to fire-resistant coatings comprising
5% to 69.4% by weight of film-forming binder,
5% to 25% by weight of blowing agent,
5% to 40% by weight of compositions according to one or more of Claims 1 to 10 as foam-forming substance,
5% to 25% by weight of carbon-forming substance,
5% to 40% by weight of auxiliaries and/or additives,
0.5% to 10% by weight of thickener,
0.1% to 10% by weight of wetting and/or dispersing additives and
10% to 40% by weight of solvent and/or solvent mixtures, wherein the components add up to 100% by weight.

The film-forming binder preferably comprises copolymers based on styrene and acrylic esters, copolymers based on acrylic esters, vinyltoluene/acrylate copolymer, styrene/acrylate polymers, homopolymers based on vinyl acetate, copolymers based on vinyl acetate, ethylene and vinyl chloride, copolymers based on vinyl acetate and the vinyl ester of a long-chain branched carboxylic acid, copolymers based on vinyl acetate and di-n-butyl maleate esters and/or acrylic esters, vinyl/acrylate copolymers, self-crosslinking polyurethane dispersions, terpenes and/or polyterpenes and/or mixtures thereof;
the blowing agents are melamine, melamine-formaldehyde condensate, guanidine, salts thereof, melamine condensation products and/or dicyandiamides; the carbon-forming substances are starch, modified starch, polyhydric alcohols (polyols) such as saccharides and polysaccharides and/or a thermoplastic or thermoset polymer resin binder, such as a phenolic resin, a urea resin, a polyurethane, polyvinylchloride, poly(meth)acrylate, polyvinylacetate, polyvinylalcohol, a silicone resin and/or a rubber;
the auxiliaries and additives are glass fibres, mineral fibres, metal fibres, carbon fibres, kaolin, talc, aluminium oxide, aluminium hydroxide, magnesium hydroxide and other metal oxides, precipitated silicas, silicates and/or pulverized celluloses; the thickeners and/or rheology additives are (modified) cellulose, silicas, bentonites, castor oil derivatives, fat derivatives, polyamides, poly(meth)acrylates, polyacrylamides, polyethers, polyurethanes, polyvinylalcohols, polyvinylpyrrolidones, sugar polymers such as gum arabic, alginate, xanthans and/or agar-agar;
the wetting and dispersing additives are alkylphenol ethoxylates, polyacrylic acids and/or polyurethanes;
the organic solvents and/or solvent mixtures are aromatic hydrocarbons, preferably xylene and/or alkylbenzenes, preferably toluene and ethylbenzene; alcohols, preferably methanol, and/or alkanols, preferably 2-methyl-1-propanol; ketones such as acetone or butanone, alkanoic esters, and/or polyethers, preferably polyglycol ethers.

The polyols are preferably tripentaerythritol and/or polycondensates of pentaerythritol and/or mixtures of pentaerythritol-based esters with polyols, polyvinylacetate, polyvinylalcohol, sorbitol and/or ethylene oxide-propylene oxide polyols.

The invention also relates to a process for producing mixtures according to one or more of claims 1 to 10, characterized in that components (A) and component (B), each in powder form or as pellets, are mixed with one another, or the dissolved component (B) is introduced into component (A).

A further process for producing mixtures according to the invention is characterized in that equimolar amounts of ammonium dihydrogenorthophosphate and urea are heated to a temperature of 250 to 300° C. for a period of 0.5 to 4 hours.

Another process for producing mixtures according to the invention is characterized in that equimolar amounts of ammonium orthophosphate and urea are heated to a temperature of 250 to 305° C. under a moist ammonia atmosphere for a period of 0.1 to 4 hours.

An alternative process for producing mixtures according to the invention is characterized in that equimolar amounts of ammonium orthophosphate and urea are heated to a temperature of 320 to 350° C. under a moist ammonia atmosphere with simultaneous addition of component (B) for a period of 0.1 to 4 hours.

A preferred field of use for ammonium polyphosphates is intumescent formulations that then later serve as fire-resistant coating in use.

It is a feature of intumescent coatings, also called insulating layer-forming fire-resistant coatings, that they foam in the event of fire under the corresponding action of heat, and this foaming of the fire-resistant coating hinders or at least prevents the passage of heat to the substrate, such as steel constructions, roofs, walls, cables, pipes and the like.

The insulation layer formed from a coating of the present invention already has excellent strength and thermal insulation properties, and features an earlier start reaction compared to conventional coating formulations. Consequently, the described intumescent coating composition according to the invention is suitable for efficient protection of steel structures and other substances, and of thermally sensitive substrates.

For instance, steel-framed buildings have many advantages over conventional construction methods, but have the major drawback that, in the event of fire, the temperature of unprotected steel quickly rises to such a degree that the steel softens, loses stiffness and hence endangers the stability of the structure (risk of collapse, preventing exit from the building etc.). It is therefore advisable to thermally insulate the steel. For instance, intumescent coatings can be applied to various structures in order to delay the heating effects of a fire. This coating slows the rate of the temperature rise of the respective substrate to which the coating is applied, and hence lengthens the time before the structure collapses owing to the heat from the fire. The additional time increases the opportunity for extinguishment of the fire and cooling of the building, and lengthens the time available for escape.

It is optionally possible to add one or more reactive flame retardants to the composition according to the invention. One example in the context of the invention is that of reactive organophosphorus compounds, such as 9,10-dihydro-9-oxa-10-phosphaphenanthrene 10-oxides (DOPO) and the derivatives and adducts thereof.

The compositions of the invention may preferably further comprise phosphinic salts (EP-A-1544206).

The use of the aforementioned phosphinic salts or diphosphinic salts reduces the start temperature of the intumescent reaction by more than 15° C. compared to the phosphinic salt-free formulation.

The organic solvents are preferably aromatic hydrocarbons, preferably xylene and/or alkyl benzenes, preferably ethyl benzene; alcohols, preferably methanol, and/or alkanols, more preferably 2-methyl-1-propanol; polyethers, preferably polyglycol ethers, more preferably alpha-isotridecyl-omega-hydroxy-polyglycol ether.

Additional additives, such as thickeners and/or rheology additives, and fillers may be added to the composition. Rheology additives used, such as anti-settling agents, anti-running agents and thixotropic agents, are preferably polyhydroxycarboxamides, urea derivatives, salts of unsaturated carboxylic esters, alkylammonium salts of acidic phosphoric acid derivatives, amine salts of p-toluenesulfonic acid, amine salts of sulfonic acid derivatives, and aqueous or organic solutions or mixtures of the compounds. In addition, it is possible to use rheology additives based on fumed or precipitated silicas or based on silanized fumed or precipitated silicas. The rheology additives preferably comprises fumed silicas, modified and unmodified sheet silicates, precipitated silicas, cellulose ethers, polysaccharides, polyurethane and acrylate thickeners, urea derivatives, castor oil derivatives, polyamides, fatty acid amides and polyolefins, provided that they are in solid form, pulverized celluloses and/or suspension media, for example xanthan gum.

Such fire-resistant coatings (intumescent coatings) are used predominantly in the form of a paintable, spreadable or rollable paint for protection of a wide variety of different substrates, preferably steel beams and steel columns, roofs, walls, cables, pipes, cable ducts, cable and combination bulkheads, doors, curtains, smoke curtains, blinds, safety cabinets, installation cabinets and the like.

The invention especially relates to the use of the fire-resistant coatings according to the invention on steel, wood, wood-based materials, paper, mineral wool, plasterboard, plastics, metals, alloys, fabrics made of synthetic or natural fibres and other suitable materials and/or as solder mask and for electrical switches and circuits. The fire-resistant coating according to the invention is of very good suitability for structural fire protection of hollow profiles and H-profiles and in workshop applications; it is likewise suitable for areas in which elevated weathering stability is required.

The mixtures according to the invention are of excellent suitability for the aforementioned use in intumescent formulations and then later as fire-resistant coating.

The mixtures according to the invention can preferably also be used in or as intumescent coating on polyolefins.

Preferred polyolefins are, for example, polymers of mono- and diolefins (e.g. ethylene, propylene, isobutylene, butene, 4-methylpentene, isoprene, butadiene, styrene), for example polypropylene, polyisobutylene, polybut-1-ene, poly-4-methylpent-1-ene, polystyrene, poly(p-methylstyrene) and/or poly(alpha-methylstyrene), polyisoprene or polybutadiene, and polyethylene (optionally crosslinked), for example high-density polyethylene (HDPE), high-density high-molecular weight polyethylene (HDPE-HMW), high-density ultrahigh-molecular weight polyethylene (HDPE-UHMW), medium-density polyethylene (HMDPE), low-density polyethylene (LDPE), linear low-density polyethylene (LLDPE), very low-density polyethylene (VLDPE), branched low-density polyethylene (BLDPE), and also polymers of cycloolefins, for example of cyclopentene or norbornene.

Preferred polymers are additionally mixtures (blends) of the above-listed polyolefins, for example polypropylene (PP) with polyisobutylene, polyethylene with polyisobutylene, polypropylene with polyethylene (e.g. PP/HDPE/LDPE) and mixtures of various types of polyethylene (e.g. LDPE/HDPE).

Polymers usable with preference are additionally copolymers of mono- and diolefins with one another and of mono- and diolefins with other vinylic monomers, for example ethylene-propylene copolymers; LLDPE, VLDPE and mixtures thereof with LDPE; propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers, copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high-impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/ propylene-styrene, and also graft copolymers of styrene or alpha-methylstyrene, for example styrene onto polybutadiene, styrene onto polybutadiene-styrene- or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkylacrylates or polyalkylmethacrylates, styrene and acrylonitrile onto acrylate-butadiene copolymers, and mixtures thereof, as known, for example, as what are called ABS, MBS, ASA or AES polymers; and also copolymers thereof with carbon monoxide or ethylene-acrylic acid copolymers and salts thereof (ionomers) and also terpolymers of ethylene with propylene and a diene, for example hexadiene, dicyclopentadiene or ethylidenenorbornene; and mixtures of such copolymers with one another and/or other polymers, for example polypropylene-ethylene-propylene copolymer, LDPE-ethylene-vinyl acetate copolymer, LDPE-ethylene-acrylic acid copolymer, LLDPE-ethylene-vinyl acetate copolymer, LLDPE-ethylene-acrylic acid copolymer, and alternating or random polyalkylene-carbon monoxide copolymers and mixtures thereof with other polymers, for example polyamides.

The mixtures according to the invention may also be used for thermoplastic polymers such as polyesters, polystyrene or polyamide, and thermoset polymers such as unsaturated polyester resins, epoxy resins, polyurethanes or acrylates.

Suitable polyesters derive from dicarboxylic acids and esters thereof and diols and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), for example high-density polyethylene (HDPE), high-density, high-molecular-weight polyethylene (HDPE-HMW), high-density, ultrahigh-molecular-weight polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol® 143E (BASF), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methacrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates/alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof, such as are known, for example, as ABS, MBS, ASA or AES polymers.

The styrene polymers are preferably comparatively coarse-pore foam such as EPS (expanded polystyrene), e.g. Styropor® (BASF) and/or foam with relatively fine pores such as XPS (extruded rigid polystyrene foam), e.g. Styrodur® (BASF).

Preference is given to polystyrene foams, for example Austrotherm® XPS, Styrofoam® (Dow Chemical) and the like.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha,beta-unsaturated acids and derivatives thereof, such as polyacrylates and polymethacrylates, polymethylmethacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers deriving from unsaturated alcohols and amines or from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals, such as polyoxymethylene, and those polyoxymethylenes which comprise comonomers, for example ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes deriving from polyethers, polyesters and polybutadienes having both terminal hydroxyl groups and aliphatic or aromatic polyisocyanates, and the precursors thereof.

The polymers are preferably polyamides and copolyamides that derive from diamines and dicarboxylic acids and/or from aminocarboxylic acids or the corresponding lactams, such as nylon-2/12, nylon-4, nylon-4/6, nylon-6, nylon-6/6, nylon-6/9, nylon-6/10, nylon-6/12, nylon-6/66, nylon-7, nylon-7,7, nylon-8, nylon-8,8, nylon-9, nylon-9,9, nylon-10, nylon-10,9, nylon-10,10, nylon-11, nylon-12, aromatic polyamides based on m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as modifier, e.g. poly-2,4,4-trimethylhexamethyleneterephthalamide or poly-m-phenyleneisophthalamide. Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The polymers are preferably polyureas, polyimides, polyamide imides, polyether imides, polyester imides, polyhydantoins and polybenzimidazoles.

The polymers are preferably polyesters deriving from dicarboxylic acids and dialcohols and/or from hydroxycarboxylic acids or the corresponding lactones, such as polyethylene terephthalate, polybutylene terephthalate, poly-1, 4-dimethylolcyclohexane terephthalate, polyhydroxybenzoates, and block polyether esters deriving from polyethers with hydroxyl end groups; furthermore polyesters modified with polycarbonates or MBS.

The polymers are preferably polycarbonates and polyester carbonates.

The polymers are preferably polysulfones, polyether sulfones and polyether ketones.

The polymers are preferably crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers are preferably crosslinkable acrylic resins that derive from substituted acrylic esters, for example from epoxy acrylates, urethane acrylates or polyester acrylates.

The polymers are preferably alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylates (polyvinyl chloride/acrylates, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

The mixtures according to the invention may also be used correspondingly in or on textiles, without impairing the properties thereof.

The mixtures according to the invention may be applied to flexible, especially textile, materials in random distribution or in a particular pattern, for example in a dot pattern. Such textiles are used, for instance, in the interior fitout of hotels, theatres and conference centres, and in modes of transport (bus, train, car, aircraft etc.).

The mixtures according to the invention can be used together with other flame retardants as described, for instance, under "Flammschutzmittel" in Römpps Chemie-Lexikon, 9th ed. (1996), pages 1369 to 1371.

Overall, the mixtures according to the invention, alone or acting with other substances, may have carbonization-promoting, fire-smothering, barrier layer-forming, insulating layer-forming or some other kind of action.

For all aforementioned applications in and on polymers, especially polyolefins, and in or for insulating layer-forming intumescent coatings and textiles, it is possible to add further additives, especially antioxidants, antistats, blowing agents, further flame retardants, heat stabilizers, impact modifiers, processing auxiliaries, lubricants, light stabilizers, anti-dripping agents, compatibilizers, reinforcers, fillers, nucleating agents, additives for laser marking, hydrolysis stabilizers, chain extenders, pigments and/or plasticizers.

Pure crystal phase II ammonium polyphosphate was used in example 1.

Pure crystal phase I ammonium polyphosphate was used in example 11.

The mixtures thus obtained show the properties reproduced in table 1.

TABLE 1

Properties of APP mixtures

|  | APP phase II % by wt. | APP phase I % by wt. | Viscosity, 10% [mPa*s] | Conductivity [µS/cm] | pH | Acid number (AN) [mg KOH/g] | Water solubility [%] | Loss of mass, 2% ° C. | Loss of mass, 300° C. % |
|---|---|---|---|---|---|---|---|---|---|
| Example 1 | 100.0 | 0.0 | 9.7 | 1197 | 6.67 | 0.20 | 0.33 | 319.6 | 0.82 |
| Example 2 | 90.0 | 10.0 | 5.2 | 2748 | 5.96 | 1.52 | 0.85 | 311.3 | 1.39 |
| Example 3 | 87.5 | 12.5 | 4.8 | 3268 | 5.84 | 2.00 | 1.00 | 306.0 | 1.54 |
| Example 4 | 85.0 | 15.0 | 4.4 | 3620 | 5.79 | 2.12 | 1.10 | 302.0 | 1.79 |
| Example 5 | 82.5 | 17.5 | 4.6 | 3971 | 5.76 | 2.76 | 1.24 | 293.0 | 2.38 |
| Example 6 | 80.0 | 20.0 | 4.4 | 4302 | 5.70 | 3.08 | 1.31 | 288.0 | 2.63 |
| Example 7 | 75.0 | 25.0 | 4.4 | 4896 | 5.56 | 3.72 | 1.44 | 296.3 | 2.28 |
| Example 8 | 67.0 | 33.0 | 4.3 | 5806 | 5.45 | 4.88 | 1.78 | 302.6 | 1.80 |
| Example 9 | 50.0 | 50.0 | 4.2 | 7709 | 5.50 | >5 | 2.35 | 299.0 | 2.06 |
| Example 10 | 25.0 | 75.0 | 4.2 | 10240 | 5.50 | >5 | 3.07 | 293.1 | 2.49 |
| Example 11 | 0.0 | 100.0 | 4.3 | 12380 | 5.54 | >5 | 3.55 | 293.6 | 2.55 |

The intumescent formulations—then later applied as fire protection coatings—were produced as follows:
a) the solvent or solvent mixture is initially charged at room temperature and the respective resin is dissolved therein while stirring, then coatings additives such as dispersing additives and optionally defoamers are added while stirring,
b) foam-forming substance, blowing agent and carbon-forming substance, and also auxiliaries and additives (for example titanium dioxide, fibres and fillers), are sprinkled in while stirring at low speed,
c) thixotropic agent is sprinkled in with stirring,
d) dispersed for at least 25 minutes with high shear forces while maintaining a temperature of 50° C. to 60° C.,
e) homogeneously dispersed for at least 5 minutes and the desired viscosity is established by addition of solvent or solvent mixtures.

These formulations may be used, for example, in the production process according to the invention for an insulating layer-forming fire-retardant coating. In this case, a silicone resin emulsion (binder) is mixed with an agent that forms foam in the event of fire and optional further auxiliaries and additives in a high-shear dissolver, and adjusted to the desired consistency.

The coating composition of the present invention may be applied directly to the surface to be coated or via a primer coating layer. The coating composition is typically applied in liquid form at temperatures between −10 and 60° C. The application can be effected, for instance, by airless spraying, casting (used in moulds), painting or trowelling.

The coating composition according to the invention may be applied to various substrates. Preference is given here to steel and aluminium substrates, and composite materials, for instance glass fibre-reinforced plastics.

The invention is elucidated without limitation in the examples which follow.

First of all, mixtures of ammonium polyphosphates are produced by mixing the amounts of crystal phase II ammonium polyphosphate apparent from table 1 with the respective amounts of crystal phase I ammonium polyphosphate in a tumbling mixer (from Heidolph) at 320 revolutions per minute (rpm) for 5 h.

The above values were determined as follows:

Viscosity

For determination of viscosity, a 10% by weight suspension of the respective product from examples 1 to 11 was prepared in water at 25° C. and stirred. Viscosity was determined by means of a Brookfield viscometer to DIN ISO 2555 (spindle 61, 100 rpm).

Conductivity

For determination of pH, a 10% by weight suspension of the respective product from examples 1 to 11 was prepared in water at 25° C. and stirred for 5 minutes. Conductivity was determined by potentiometry (from Knick, model 703 conductometer)

pH

For determination of pH, a 10% by weight suspension of the respective product from examples 1 to 11 was prepared in water at 25° C. and stirred for 5 minutes. The pH was determined by means of potentiometry (Metrohm, LL Aquatrode Plus WOC).

Acid Number

For determination of acid number, a 10% by weight suspension of the respective product from examples 1 to 11 was prepared in water at 25° C. and stirred for 5 minutes. The acid number was determined to ISO 2114.

Water Solubility

A 10% by weight suspension of the ammonia polyphosphate or mixtures thereof was prepared in water at 25° C., and stirred and filtered. The dry residue of the filtrate based on the amount used (10% suspension) corresponds to the water solubility of this ammonium polyphosphate.

Loss of Mass

Loss of mass can be represented in various ways:
1) Temperature (° C.) for a 2% loss of mass
2) Loss of mass at 300° C. in %

Loss of mass was determined under a nitrogen atmosphere by thermogravimetry by means of an MA35M-230N instrument from Sartorius.

The bulk density of the flame retardant mixture was determined to EN ISO; DIN 53468 at 25° C.

The particle size $d_{50}$ was determined with the aid of a Malvern Mastersizer.

It is apparent from examples 1 to 11 in table 1 that some properties of the products therein are adversely affected by the addition of phase I ammonium polyphosphate to phase II ammonium polyphosphate. For example, there is a rise in solubility to more than 3%, and a significant increase in conductivity. As a further disadvantage, there is a rise in the acid number to more than 5 mg KOH/g and a decrease in thermal stability when there is an increase in the phase I ammonium polyphosphate content in the mixture.

When corresponding coatings are used in areas exposed to weathering or other outside influences, the effect of moisture can result in leaching of ammonium polyphosphate, which is no longer available for the intumescence reaction. This is expected to result in lowering of the intumescent action. For that reason, it is productive to keep the APP solubility low.

The elevated salt concentration in solution which is associated with the solubility of short-chain ammonium (poly)phosphates can be illustrated, inter alia, by the determination of the conductivity.

In addition, the high salt burden during the storage of intumescent systems with aqueous binders, through disruption of dispersion stability, can lead to an unwanted shortened storage stability, manifested by an irreversible increase in viscosity.

For instance, in the case of incorporation of examples 1, 4 and 6 into the intumescent formulation described in WO2017153227A1, good compatibility was observed.

By comparison with the use of pure phase II APP (example 1), in the case of examples 4 and 6, it was not possible to detect any increase in viscosity in the end product after 24 h. It was not possible to observe any increase in the fire resistance time (dry layer thickness of 2000 μm) of the intumescent coatings that have been produced with the crystal phase mixtures (examples 4 and 6). The foam characteristics additionally showed slight inhomogeneities and reduced stability. Especially in the case of application of relatively high layer thicknesses, this can lead to detachment of the foam during the fire test.

| Intumescent formulation | Viscosity (mPas) | FRT (up to 300° C., min) | FRT (up to 500° C., min) |
| --- | --- | --- | --- |
| Produced from example 1 | 12400 | 51 | 104 |
| Produced from example 4 | 12450 | 51 | 105 |
| Produced from example 6 | 12650 | 52 | 103 |

If, by contrast, the mixtures of the invention are used in solvent-based intumescent coatings, a distinct rise in insulating action is observed.

The products from examples 1 and 4 were used to produce solution-based intumescent formulations of examples 12 and 13.

EXAMPLE 12

The ammonium polyphosphate from example 1 was used to produce an intumescent formulation of the following composition:
28 parts by weight of ammonium polyphosphate from example 1,
10 parts by weight of resin (Omnova, Pliolite® Ultra 100),
8 parts by weight of melamine (OCI, Melafine®),
8 parts by weight of pentaerythritol (Perstorp, Charmor® PT 40),
9 parts by weight of titanium dioxide (Cristal, Tiona® 696),
6 parts by weight of chloroparaffin (Dover Chemicals, Hordaresin® NP 70),
ad 100 parts by weight of thickener (Luvotix® VP 031), Auxiliaries and additives (butyldiglycol acetate (BDGA), Texanol®), dispersing additives, paint additives, solvents (Shellsol® 100/140, xylene).

EXAMPLE 13

The procedure was as in example 12, except that, rather than 28 parts by weight of ammonium polyphosphate from example 1, 28 parts by weight of a mixture of phase II ammonium polyphosphate (85% by weight) and phase I ammonium polyphosphate (15% by weight) from example 4 was used.

The respective intumescent formulation in Examples 12 and 13 was produced as follows:
a) The solvent is initially charged at room temperature, and paint additives (Disperbyk®-2163 from BYK), dispersing aids and optionally defoamers are added while stirring,
b) the respective mixture from example 1 or 4, blowing agents, carbon source, titanium dioxide, fillers are sprinkled in while stirring at low speed, followed by the thixotropic agent,
c) the mixture is dispersed with high shear forces for 20 to 60 minutes while maintaining a temperature of 30 to 70° C., and then the desired viscosity is established by addition of solvents at low shear forces.

The intumescent formulations thus produced were applied as intumescent coatings to a coated steel plate (S235JR no. 1.0122 to Standard EN 10025-2:2004; dimensions: 280× 280×5 mm), and a fire test was conducted analogously to DIN 4102 Part 8, fire curve ISO 834, with a dry film thickness of 2000 μm. FIG. 1 shows the progression of the temperature of the reverse side of the plate as a function of time.

It was found here that, surprisingly, the time until attainment of a temperature on the reverse side of the plate of $T_{critical}$=500° C., in the case of use of the mixture from example 4, was significantly higher at 109 minutes compared to the pure substance from example 1 at 100 minutes. This means that, in the case of the use according to the invention, the critical softening temperature of the steel is reached only at a later juncture and hence the protective action is more efficient. The structural integrity of the steel structure can thus be maintained for longer.

This is thus a gain in performance of 9%. The attainment of a temperature on the reverse side of only 300° C. takes 32 min in the case of example 1, and 48 min in the case of example 4; this means an increase in the fire protection time by 50%.

Figure 2:
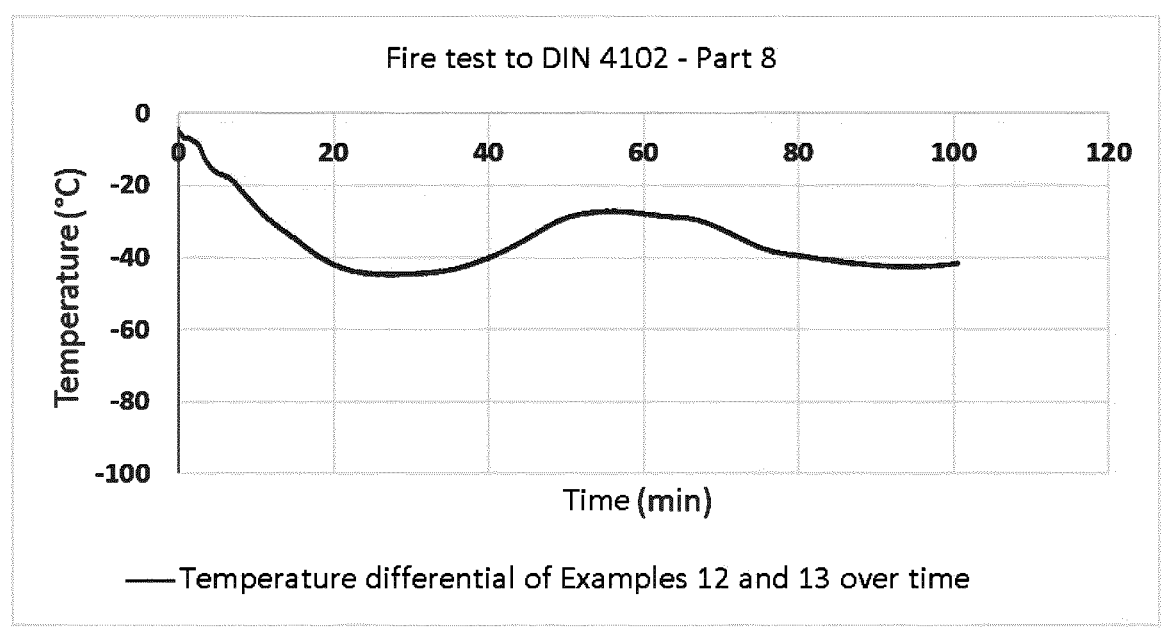

If, as in FIG. 2, the temperature differential of the temperature on the reverse side of the steel for examples 12 and 13 is plotted over time, it is found that the insulating effect of example 13 is higher over the entire progression of the fire. The maximum temperature differential of 45° C. is observed after a time of about 27 min.

With the inventive mixtures from examples 12 and 13, inter alia, a start reaction already occurs at lower temperature compared to example 1, as a result of which there is an earlier (faster) onset of insulating action, and the substrate coated with the intumescent formulations according to the invention can be much better thermally insulated. When the systems described are used in structural steel construction, this enables longer-lived and/or more efficient fire protection systems. As a result of a longer fire resistance time, residents of a building can leave it over a longer period of time in the event of fire, and firefighters are able to fight the fire in a safe environment.

The intumescent formulation according to the invention, on account of the earlier onset of insulating action, can now be used to render substrates fire-resistant that have not been protectable from heat to date owing to their low melting point. For instance, it is also possible to protect polymers and other substrates that soften even at low temperatures (e.g. 300° C.) or release combustible and/or toxic pyrolysis gases.

The advantages of the intumescent formulations according to the invention are apparent from another point of view as well:

TABLE 2

Measurement of the fire resistance time of the products from example 1 and example 4

| T [° C.] | Phase II ammonium polyphosphate from example 1 (comparison) Time until attainment of the temperature specified t [min] | Mixture of phase II ammonium polyphosphate (85% by wt.) and phase I (15% by wt.) from example 4 Time until attainment of the temperature specified t [min] | Difference in time between the products from example 1 and example 4 for attainment of the temperature specified | Increase in the duration of protection in the case of use of the product from example 4 compared to example 1 in % |
|---|---|---|---|---|
| 200 | 9 | 9 | 0 | 0 |
| 225 | 12 | 17 | 5 | 42 |
| 250 | 17 | 29 | 12 | 71 |
| 275 | 26 | 44 | 14 | 69 |
| 300 | 39 | 60 | 21 | 54 |
| 325 | 63 | 76 | 13 | 21 |

For example, a substrate temperature of 250° C. is reached after only 17 minutes in example 1 (comparison), and not until 29 minutes in inventive example 4. Thus, the intumescent coating according to the invention is almost twice as effective as pure phase II ammonium polyphosphate within the appropriate temperature range.

Thus, it is possible to prevent passage of fire very much more efficiently in the case of non-metal-based substrates, for instance thermoplastics, which often have melting points or breakdown temperatures of 300° C. or less. Practical examples here are, for example, structural material panels such as roof panels, partition walls etc., or else composite materials that are used in critical environments (battery housing or pressurized hydrogen storage facilities).

The higher fire resistance times at lower temperatures resulting from the use of the mixture according to the invention advantageously lead to material savings; it is likewise possible to apply a lower layer thickness for achievement of the same effect.

The percentage increase in performance is 71% at 250° C. within a comparatively low temperature range.

The inventive mixtures of ammonium polyphosphates of different crystal phases are therefore of excellent suitability for production of faster-acting intumescent coatings, which additionally have enhanced material efficiency.

The intumescent coatings of examples 12 and 13 that are based on examples 1 and 4 were applied to panel materials made of various plastics, and fire tests were conducted to DIN 4102 Part 8, fire curve ISO 834, with a dry film thickness of 2000 μm.

EXAMPLE 14

Application to Ultramid® A3K (BASF; melting temperature to ISO 11357: 260° C.): The critical softening temperature of 260° C. of the polymer was reached after only 21 minutes with the intumescent formulation for example 12, but only after 35 minutes with the inventive intumescent formulation from example 13. It follows that the fire resistance time is 67% longer when the intumescent formulation according to the invention is used.

EXAMPLE 15

Application to a Makrolon® 2205 Polycarbonate Panel (Covestro; Melting Temperature to ISO 11357: 300° C.):

The critical softening temperature of 300° C. of the polymer was reached after only 37 minutes with the intumescent formulation for example 12, but only after 58 minutes with the inventive intumescent formulation from example 13. It follows that the fire resistance time is 57% longer when the intumescent formulation according to the invention is used.

EXAMPLE 16

Application to a Glass Fibre-Filled Composite Panel Produced In-House (DICY-Cured Bisphenol a Epoxy Resin):

The critical breakdown temperature of 320° C. of the substrate was reached after only 62 minutes with the intumescent formulation for example 12, but only after 74 minutes with the inventive intumescent formulation from example 13. It follows that the fire resistance time is 19% longer when an intumescent formulation according to the invention is used.

EXAMPLE 17

Application to an Aluminium Panel

The critical softening temperature of 320° C. of the substrate was reached after only 62 minutes with the intumescent formulation for example 12, but only after 74 minutes with the inventive intumescent formulation from example 13. It follows that the fire resistance time is 19% longer when an intumescent formulation according to the invention is used.

The mixture from inventive example 4 was also used for production of solvent-based intumescent formulations using the following resins (table 3):

Example 18: Styrene-acrylate copolymer—Pliolite® Ultra 100 (Omnova/Synthomer)
Example 19: Methacrylate copolymer—Dianal® Tb 080 (Evonik)
Example 20: Methacrylate—Degalan® Lp 65/11 (Evonik)
Example 21: Styrene-acrylate copolymer—Pliolite® Ac 80 (Omnova/Synthomer)
Example 22: methacrylate—Viacryl® Sc 124/50Ws (Alinex)
Example 23: Methacrylate—Degalan® Lp 63/11 (Evonik)

TABLE 3

Solvent-based intumescent formulations with various resins

| | T [° C.] | Time until attainment of the temperature specified t [min] | Gain in % compared to use of example 1 |
|---|---|---|---|
| Pliolite Ultra 100 | 300 | 44 | 42 |
| Dianal TB 080 | 300 | 60 | 20 |
| Dianal TB 080[1] | 300 | 48 | 37 |
| Degalan LP 65/11 | 300 | 50 | 43 |
| Pliolite AC 80 | 300 | 62 | 48 |
| Viacryl SC 124/50WS | 300 | 58 | 66 |
| Degalan LP 63/11 | 300 | 65 | 20 |
| Pliolite Ultra 100 | 500 | 113 | 14 |
| Dianal TB 080 | 500 | 121 | 6 |
| Dianal TB 080 | | 123 | 8 |
| Degalan LP 65/11 | 500 | 127 | 10 |
| Pliolite AC 80 | 500 | 122 | 20 |
| Viacryl SC 124/50WS | 500 | 124 | 5 |
| Degalan LP 63/11 | 300 | 113 | 0 |

[1]Using example 7

Table 3 describes the variability of the flame retardant mixture according to the invention. Even though no extension of the FRT up to 500° C. was observed in some cases, the earlier activation is manifested by an earlier onset of start reaction across the board.

In all experiments, moreover, the preferred foam properties with regard to surface adhesion, expansion, homogeneity and pore size were maintained.

It was found here that the inventive mixture from example 4 in the respective intumescent formulation according to the invention leads to longer times in each case until attainment of the critical temperature compared to the mixture from example 1.

The inventive mixtures of phase II ammonium polyphosphates with phase I ammonium polyphosphates are therefore of excellent suitability for production of efficient intumescent formulations.

The invention claimed is:

1. A composition comprising
as component (A) 65% to 92% by weight of phase II ammonium polyphosphate and
as component (B) 8% to 35% by weight of phase I ammonium polyphosphate,
where the sum total of the components is 100% by weight, and
wherein the composition has:
a residual moisture content of less than 0.5%, measured according to ISO 760,
a bulk density of 0.3 to 0.9 g/cm$^3$,
a water solubility of less than 1.5%, measured as a 10% suspension in water at 25° C.,
a viscosity of less than 40 mPas, measured by Brookfield DV3T, speed 50 rpm, spindle 1,
a particle size $d_{50}$ of 5 to 50 μm, measured by laser diffraction,
a particle size $d_{90}$ of 10 to 60 μm, measured by laser diffraction, and
a pH of 4 to 8, measured as a 10% suspension in water at 25° C.

2. The composition according to claim 1, wherein the component A is a phase II ammonium polyphosphate having the formula $(NH_4)_{n+2}P_nO_{3n+1}$ with n=300 to 100 000.

3. The composition according to claim 1, wherein the component A is a phase II ammonium polyphosphate having the formula $(NH_4)_{n+2}P_nO_{3n+1}$ with n=1000 to 25 000.

4. The composition according to claim 1, wherein the component B is a phase I ammonium polyphosphate having the formula $(NH_4)_{n+2}P_nO_{3n+1}$ with n=5 to 100.

5. The composition according to claim 1, wherein the ammonia polyphosphates have been microencapsulated with at least one selected from the group consisting of
organofunctional (poly)silanes;
(poly)siloxanes;
(poly)silazanes;
modified waxes;
polyurethane;
polyepoxides;
urea-formaldehyde resins;
melamine-formaldehyde resins; and
emulsions based on
(meth)acrylate resins,
styrene/acrylate copolymers,
urethanes,
ethylene/nonyl acetate copolymers, and/or
rubber.

6. The composition according to claim 2, wherein the component B is a phase I ammonium polyphosphate having the formula $(NH_4)_{n+2}P_nO_{3n+1}$ with n=5 to 100.

7. The composition according to claim 1, further comprising up to 10% by weight, based on the amount of the components (A) and (B), of ammonium sulfate, triethylammonium sulfate, tetramethylammonium sulfate, trimethylammonium sulfate, dimethyl sulfate, diethyl sulfate, dipropyl sulfate, sodium octylsulfate, sodium decylsulfate, sodium octadecylsulfate, lauryl sulfate, urea sulfate, melamine sulfate, hydroxylamine sulfate, hydrazine sulfate, potassium sulfate, potassium hydrogensulfate, sodium sulfate, sodium hydrogensulfate, magnesium sulfate, magnesium hydrogensulfate, calcium sulfate, calcium hydrogensulfate, barium sulfate, potassium aluminium sulfate, aluminium sulfate, iron (III) sulfate, iron (II) sulfate, cobalt sulfate, titanium sulfate, zinc sulfate, tin sulfate, cerium sulfate, lithium sulfate, trimethylsulfonium methylsulfate, or mixtures thereof.

8. A product comprising the composition according to claim 1, wherein the product is a plug connector, a current-bearing component in a power distributor, a circuit board, a potting compound, a power connector, a circuit breaker, a lamp housing, an LED lamp housing, a capacitor housing, a coil element, a ventilator, a grounding contact, a plug, an in/on printed circuit board, a housing for a plug, a battery housing, a cable, a flexible circuit board, a charging cable, a motor cover, or a textile coating.

9. A fire-resistant coating steel, wood, a wood-based material, paper, mineral wool, plasterboard, plastic, metal, an alloy, fabric made of synthetic or natural fibres, a solder mask, an electrical switch or a circuit wherein the fire-resistant coating comprises the composition according to claim 1.

10. A coating for a steel construction, the coating comprising the composition according to claim 1, wherein the steel construction is a steel beam, a steel support, a ceiling, a wall, a cable, a pipe, a conduit, a cable, a combination bulkhead, a door, a curtain, a smoke barrier, a blind, a safety cabinet, or an installation cabinet.

11. A fire-resistant coating comprising the composition according to claim 1 as a foam-forming substance and at least one selected from the group consisting of
one or more film-forming binders;
one or more blowing agents;
one or more carbon-forming substances;
one or more auxiliaries;
one or more additives; one or more dispersing additives and one or more solvents.

12. A fire-resistant coating comprising
5% to 40% by weight of the composition according to claim 1 as a foam-forming substance,
5% to 69.4% by weight of a film-forming binder,
5% to 25% by weight of a blowing agent,
5% to 25% by weight of a carbon-forming substance,
5% to 40% by weight of auxiliaries and additives,
0.5% to 10% by weight of a thickener,
0.1% to 10% by weight of dispersing additives, and
10% to 40% by weight of one or more solvents, wherein the components sum to 100% by weight.

13. The fire-resistant coating according to claim 12, wherein
the film-forming binder comprises at least one selected from the group consisting of
one or more copolymers based on styrene and an acrylic ester;
one or more copolymers based on an acrylic ester;
a vinyltoluene/acrylate copolymer;
one or more styrene/acrylate polymers;
one or more homopolymers based on vinyl acetate;
one or more copolymers based on vinyl acetate;
a copolymer of ethylene and vinyl chloride;
one or more copolymers based on vinyl acetate and the vinyl ester of a long-chain branched carboxylic acid;
one or more copolymers based on vinyl acetate and a di-n-butyl maleate ester esters or an acrylic ester;
one or more vinyl/acrylate copolymers;
one or more self-crosslinking polyurethane dispersions;
terpenes and polyterpenes;
the blowing agent is
at least one selected from the group consisting of melamine, melamine-formaldehyde condensate, guanidine or a salt thereof, a melamine condensation product and dicyaniamide;
the carbon-forming substance is at least one selected from the group consisting of starch, modified starch, polyhydric alcohols, and a thermoplastic or thermoset polymer resin binder;
the auxiliaries and additives are at least one selected from the group consisting of glass fibres, mineral fibres, metal fibres, carbon fibres, kaolin, talc, aluminium oxide, aluminium hydroxide, magnesium hydroxide or other metal oxides, precipitated silicas, silicates and pulverized celluloses;
the thickener is at least one selected from the group consisting of cellulose, silicas, bentonites, castor oil derivatives, fat derivatives, polyamides, poly(meth)acrylates, polyacrylamides, polyethers, polyurethanes, polyvinylalcohols, polyvinylpyrrolidones and sugar polymers;
the dispersing additive is an alkylphenol ethoxylate, a polyacrylic acid, or a polyurethane; and
the one or more solvents are selected from aromatic hydrocarbons, alcohols, ketones, alkanoic esters, and polyethers.

14. The fire-resistant coating according to claim 13, wherein the carbon-forming substance comprises one or more polyhydric alcohols selected from tripentaerythritol, polycondensates of pentaerythritol, mixtures of pentaerythritol-based esters with polyhydric alcohols, polyvinylacetate, polyvinylalcohol, sorbitol, and ethylene oxide-propylene oxide polyhydric alcohols.

* * * * *